United States Patent Office 3,072,787
Patented Jan. 8, 1963

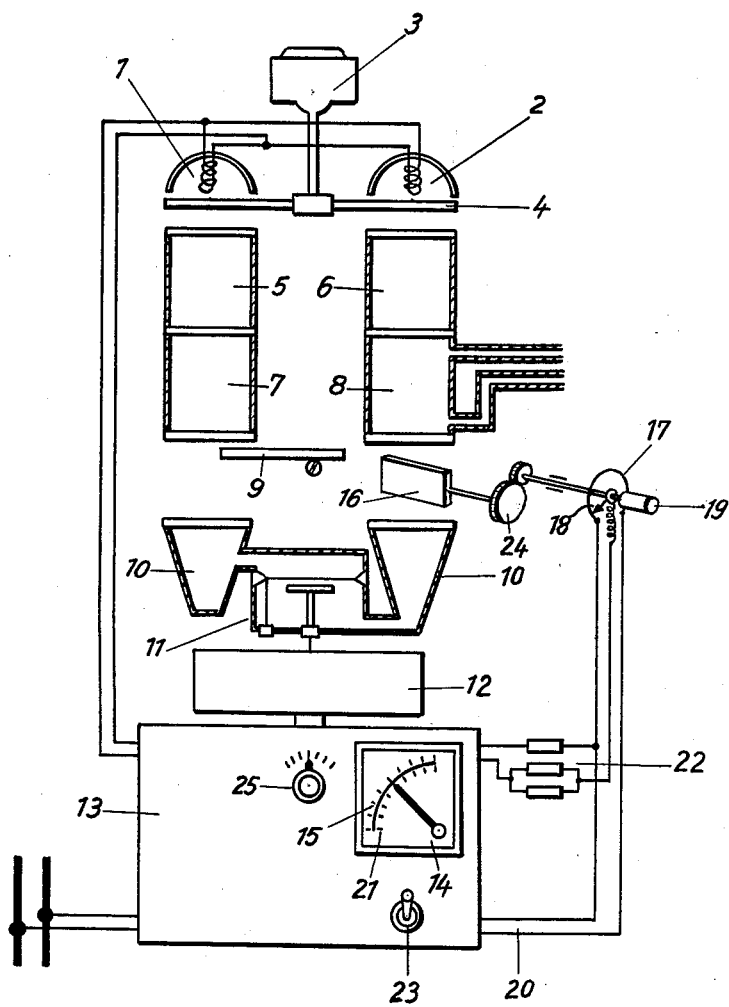

3,072,787
GAS ANALYZING INSTRUMENT
Peter Moyat, Frankfurt am Main Bergen-Enkheim, Germany, assignor to Hartmann & Braun Aktiengesellschaft, Frankfurt am Main, Germany, a corporation of Germany
Filed Aug. 17, 1959, Ser. No. 834,053
Claims priority, application Germany Aug. 20, 1958
6 Claims. (Cl. 250—43.5)

The invention relates to a gas analyser based on the principle of absorbing infrared rays. A beam of infrared rays passes through a sample of the gas mixture under test and another beam of rays passes a sample of non-absorbing gas. Both paths of radiation are modulated by a rotating shutter in the same or reverse direction and their intensity is compared in one or more counter-connected receivers responding selectively to the radiation of the wave length absorbed by the gas component to be measured. The difference of intensity of the two modulated beams of ray impinging on the receiver represents a measure for the component contained in the test gas. Such equipment is extremely sensitive to outside disturbances. Slight changes of the operating condition may affect the calibration. There are especially current uncontrollable changes of the zero point and of the measuring sensitivity which necessitate frequent recalibration. This is rather complicated because especially calibrataed gas samples with different concentration of the component under test are necessary. Such recalibration is also very time consuming and causes considerable periods of shutdown.

These disadvantages become noticeable particularly if the apparatus is used in laboratories or for the purpose of diagnostics in the medical field because in this case very often the position of the analyser must be changed and each change of location may result in a change of the calibration and of the zero point. The main purpose of the present invention is therefore to provide a gas analyser of the described pattern with the possibility of quick and reliable readjustment of the zero point and of the sensitivity of indication. Another special feature is the possibility of eliminating in a simple manner the influence of existing temperature conditions on the measurement and the calibration carried out before the measurement. A further purpose of the invention is to provide a transportable apparatus used predominantly for the supervision of gases for narcosis with the possibility of recalibrating the indication characteristic before the measurement without any difficulties.

The invention is described in detail with reference to the drawings. 1 and 2 denote the two sources of radiation emitting the beam of measuring rays and the beam of reference rays. Shutter 4 driven by motor 3 and modulating the two beams of ray in the same sense rotates before these radiation sources. In the path of source 1 filter cell 5 and cell 7 filled with the reference gas are arranged, whereas in the path of source 2 the filter cell 6 corresponding to cell 5 and cell 8 with the gas under test are installed. The receiver is constituted by the two cells 10 filled with the gas component to be measured in the gas under test. Therefore the receiver cells respond selectively to the percentage of the radiation the wave length of which is absorbed by the component to be measured in the gas under test. Cells 10 are connected to the two halves of cell 11 divided by a membrane. This membrane and the opposed electrode constitute a membrane condenser the output of which is connected to amplifier 12 and main amplifier 13. The output of the main amplifier is connected to indicator 14 via switch 23. If the two paths of radiation originating from source 1 and 2 are influenced in the same way—which is the case if the test gas in cell 8 does not contain the component to be measured—the pressure fluctuations due to radiation are equal in the two cells at both sides of the membrane condenser and the membrane of the condenser remains undisturbed. A change of the absorption conditions in the two paths caused by the presence of the component to be measured in cell 8 filled with the test gas produces a movement of the condenser membrane with the frequency of the modulator shutter 4. These periodical voltage fluctuations at the electrodes of membrane condenser 11 are amplified by preamplifier 11 and main amplifier 13 and indicated by the electric instrument 14 as a measure for the gas concentration to be determined. The shiftable shutter 9 is intended for symmetrization of the two paths of radiation with the measuring cell filled with non-absorbing gas.

In the beam of radiation source 2 between measuring cell 8 and the respective receiver chamber 10 there is knife edge 16 arranged pivoting around an axle vertical to the path of beams. Parallel to the path of beams the knife edge 16 hardly influences the path of source 2 and the still existing influence can be compensated by shifting shutter 9. However vertical to the path of radiation the knife edge 16 interrupts the major portion of the radiation energy of source 2 and therefore does not reach receiver cell 10. The knife edge is connected via gear 24 with ratio 3:1 to slider 18 of potentiometer 17, slider 18 to be adjusted by means of knob 19. Potentiometer 17 is fed with constant voltage via lead 20, this voltage to be taken preferably from a stabilized heating voltage source for the tubes of amplifier 13. Via switch 23 the indicator 14 can be connected alternatively to the output of preamplifier 12 and consequently the measuring voltage is connected to tapping 18 of potentiometer 17.

Calibration of the infrared gas analyser by means of the equipment covered by the invention is achieved as follows: Cell 8 intended for the test gas is filled with a non-absorbing gas. The indicator connected to the amplifier output via switch 23 then indicates zero. If this is not the case, the pointer must be adjusted by shutter 9 or by counter-connecting a constant voltage at the input of the unit. The parallel position of knife edge 16 to the path of radiation corresponds to the absence of the component to be measured in the test gas. With this position of knife edge 16 no voltage will be tapped off by slider 18 at slide wire potentiometer 17. When connecting instrument 14 via switch 23 to the output of the slide wire potentiometer 17, 18, the latter will indicate zero. Scale 21 of instrument 14 is divided in such a manner that the percentage of the component contained in the test gas is read off according to the position of knife edge 16, whereas the main scale 15 of instrument 14 is calibrated direct in units of the component to be measured in the test gas. For calibrating the instrument it is necessary to adjust shutter 16 and thus the slide wire potentiometer to the desired calibration range. This position of knife edge 16 corresponds to the absorption in cell 8 wih a definite percentage of the component contained in the test gas. Consequently also the voltage taken from potentiometer 17, 18, and indicated by instrument 14 on scale 21 corresponds to a definite percentage of the component contained in the test gas. After switching instrument 14 to the output of membrane condenser 11 by actuating switch 23 the same measuring value must be indicated by instrument 14 on main scale 15 as previously in the other position of switch 23 on scale 21. This check is possible at any point of the range by a simple manipulation. Any disturbance of calibration is eliminated by shifting the zero point and by varying amplifier 13 by means of an adjustment knob 25.

The arrangement of the invention offers in conjunction with gas analysers without temperature control by a thermostat the possibility to adapt the calibration of the existing temperature and thus to carry out a temperature corrected measurement. For this end a temperature depending resistance or resistance combination 22, preferably with negative temperature coefficient, is connected in series to instrument 14 in the circuit of potentiometer 17 and sliding contact 18. If then calibration is carried out as outlined above, a temperature responsive calibration will be obtained. In this case not the measured value as a function of the existing temperature is varied as is often the case with equipment fitted with temperature compensation, but calibration is carried out as a function of the existing temperature. For instruments the calibration of which has to be checked anyhow before each measurement (indispensable for infrared gas analysers used in laboratories and for medical diagnostics) the described method enables simple and quick correction of measuring errors due to temperature fluctuations.

I claim:

1. In an infrared analyser for fluids, means for producing at least two beams of infrared radiation, a detector having two compartments for receiving the two respective beams and for comparing the beams in terms of electrical quantities, containers for fluid between said means and detector and substantially transparent to the beams, an electrical measuring instrument, means for selectively connecting the instrument to the detector for the instrument to indicate a comparison of the beams entering the detector, variable interceptor means for regulating at will the amount of radiation of one beam that enters the detector, and electrical means selectively connected to said instrument for enabling the instrument to indicate independently of the detector the amount of interception by the interceptor means.

2. In an infrared radiation instrument for analysing gas mixtures, two sources of infrared radiation and means for causing the radiation of each source to travel along a different path, a ray chopper for periodically interrupting the two ray beams, two infrared sensitive cells, each arranged in one of the two different ray paths, gas filled cells provided with transparent windows in each of the infrared ray beams, an electrically tuned amplifier provided with zero and gain adjusting means and connected to said two infrared sensitive cells, an electrical indicating instrument which can be connected to the amplifier, at least one continuously manually adjustable shutter for causing a definite adjustable variation of the intensity of one ray beam, a slide-wire potentiometer having an adjustable sliding contact connected to said continuously adjustable shutter, a temperature sensitive resistance combination connected to said slide-wire potentiometer, and switching means for alternatively connecting the outputs of said amplifier and said potentiometer sliding contact to the electrical indicating meter.

3. Improved device for calibrating a non dispersive infrared radiation gas tester including two infrared radiation sources and selective infrared radiation detective means with sample gas cells, filtering cells and compensating cells between each of the infrared radiation sources and said radiation selective means, an electrical amplifier provided with zero and gain adjusting means connected to said radiation detective means and an electrical indicating meter which can be connected to the amplifier, a continuously adjustable ray shutter arranged between one of the infrared radiation sources and the radiation selective means, a slide-wire potentiometer having a sliding contact, means for transmitting motion of the shutter to the contact, a constant voltage source for feeding said slide-wire potentiometer, a temperature sensitive resistance combination in the potentiometer circuit, and switching means for alternatively connecting said amplifier and said potentiometer to said electrical indicating meter.

4. Improved device for calibrating a non dispersive infrared radiation gas tester including two infrared radiation sources and selective infrared radiation detective means with sample gas cells, filtering and compensating cells between each of the infrared radiation sources and said radiation selective means, a chopper for periodically interrupting the infrared radiation, an electrical amplifier provided with zero and gain adjusting means connected to said radiation detective means and an electrical indicating or recording meter which can be connected to the amplifier, said calibrating device comprising an adjustable ray shutter arranged between one of the infrared radiation sources and the radiation selective means, a slide-wire potentiometer having a sliding contact connected to said adjustable shutter to move therewith a constant voltage source for feeding said slide-wire poentiometer, a temperature sensitive resistance combination in the potentiometer circuit and switching means for alternatively connecting said amplifier or said potentiometer sliding contact to said electrical indicating meter.

5. Improved device for calibrating a non dispersive infrared radiation gas tester including two infrared radiation sources and selective infrared radiation detective means with sample gas cells, filtering and compensating cells between each of the infrared radiation sources and said radiation selective means, and a chopper for periodically interrupting the infrared radiation, a tuned electrical amplifier provided with zero and gain adjusting means connected to said radiation detective means and an electrical indicating meter connected to the amplifier, a calibrating device consisting of an adjustable ray shutter arranged between one of the infrared radiation sources and the radiation selective means, a slide-wire potentiometer whose sliding contact is connected to said adjustable shutter, a constant voltage source for feeding said slide-wire potentiometer, a temperature sensitive resistance combination in the potentiometer circuit and a second electrical indicating meter connected to the electrical circuit consisting of said slide-wire potentiometer and temperature sensitive resistance combination with its feeding voltage source.

6. In an infrared analyser for fluids, means for producing two beams of infrared radiation; a detector having two compartments for receiving the two respective beams and comparing the beams in terms of an output in electrical quantities; an amplifier for amplifying the output quantities; containers for fluid between said means and detector and substantially transparent to the beams, one of said containers being a sample container having inlet and outlet means for the entry and removal of analysis gas; an electrical measuring instrument having two scales and connectable to the amplifier output for indicating the amplifier output on the first of said scales; a manually adjustable shutter in the path of the beam passing through the sample chamber to simulate absorption of radiation by an attenuating component in the sample chamber and movable to non-intercepting position; electrical means selectively connectable to said instrument for indicating the position of the shutter on the second of said scales independently of the detector, the second scale being calibrated to indicate simulated absorption in the sample chamber, and switch means for selectively connecting said electrical means and the output of the amplifier to the electrical instrument, whereby when the shutter position is varied and simulated absorption is indicated on the second scale for a given position of the shutter, the switch means may be thrown to connect the amplified detector output to the instrument to determine whether the amplifier so amplifies the detector output to a value correspond to the simulated absorption.

References Cited in the file of this patent

UNITED STATES PATENTS

| | | |
|---|---|---|
| 2,467,812 | Clapp | Aug. 19, 1949 |
| 2,718,597 | Heigl et al. | Sept. 20, 1955 |
| 2,875,340 | Liston | Feb. 24, 1959 |
| 2,986,633 | Martin | May 30, 1961 |

FOREIGN PATENTS

| | | |
|---|---|---|
| 577,419 | Canada | June 9, 1959 |